(No Model.) 2 Sheets—Sheet 1.

A. N. PARRY.
CARRIAGE.

No. 474,029. Patented May 3, 1892.

Witnesses:
Eugene Humphrey
Eben Hutchinson, Jr.

Inventor:
Augustus N. Parry
per T. W. Porter, Atty.

(No Model.)  2 Sheets—Sheet 2.
A. N. PARRY.
CARRIAGE.

No. 474,029. Patented May 3, 1892.

UNITED STATES PATENT OFFICE.

AUGUSTUS N. PARRY, OF AMESBURY, MASSACHUSETTS.

CARRIAGE.

SPECIFICATION forming part of Letters Patent No. 474,029, dated May 3, 1892.

Application filed November 24, 1891. Serial No. 412,952. (No model.)

*To all whom it may concern:*

Be it known that I, AUGUSTUS N. PARRY, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
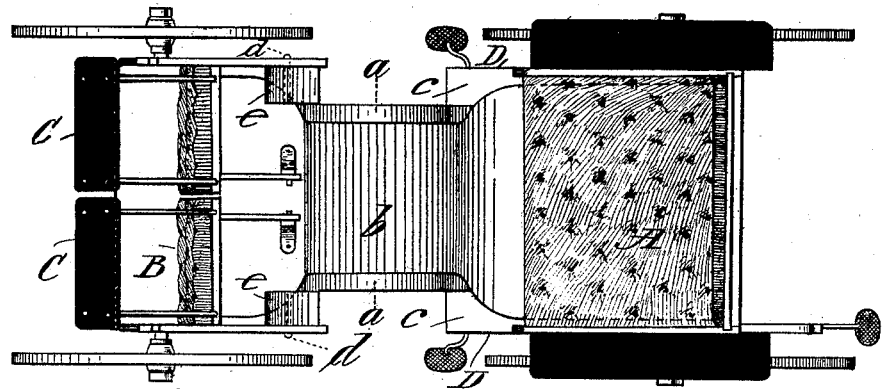
Figure 2:
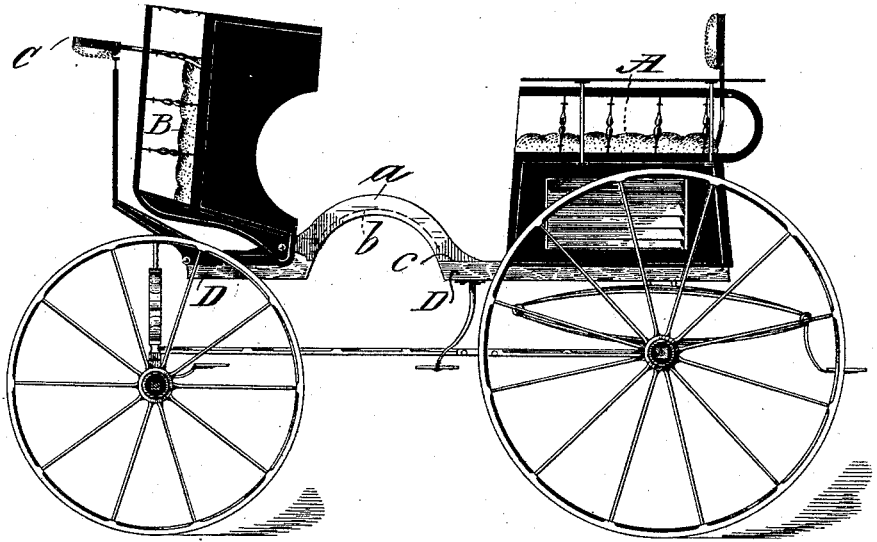
Figure 3:
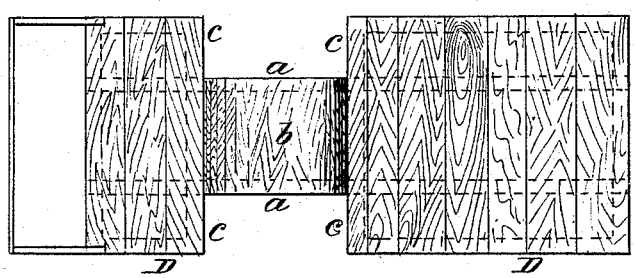
Figure 4:
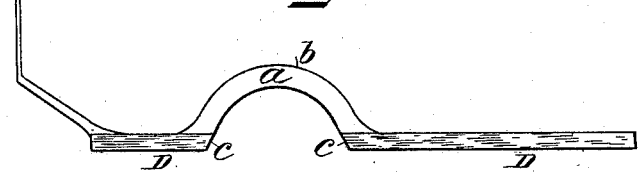

In said drawings, Figure 1 is a top plan view of a carriage embodying my invention, and Fig. 2 is a side elevation thereof, taken at the left-hand side of the vehicle, the front seats being turned forward in both views, as when the occupants of the rear seat are entering or leaving the carriage. Figs. 3 and 4 show modifications in the construction of the carriage.

The object of my invention is to provide more room between the rear seat and the wheel-house of the carriage-body, and hence it is applicable to such carriages as are formed with a wheel-house, beneath which one or the other of the front wheels passes when the carriage is turned around; and the invention consists in constructing the body at the wheel-house narrower than at other points by recessing or moving inward the side sills of the wheel-house and then forming upon the door a portion that closes the space between the inner wall of the door and the side sill of the wheel-house, all as will, in connection with the accompanying drawings, be hereinafter fully explained, and pointed out in the appended claims.

Referring again to said drawings, A represents the rear seat, and B represents the left-hand and C the right-hand half of the front seat, these parts being common and well known.

The side sills of the body are shown at D, and at the wheel-house the letter $a$ represents the side sill. The casing of the wheel-house is represented at $b$ and constructed in the usual manner.

The side sills $a$ of the wheel-house, instead of being flush with the outside edge of sills D, are set inward a suitable distance, as shown at $c$, so as to be out of the way of passengers when entering or leaving the rear seat when the front seat is turned forward.

Upon the inner sides of parts B C of the front seat I form the inwardly-projecting covers $e$ $e$, which correspond in curvature with side sills $a$, and which are so arranged upon the seat as to constitute a continuation of casing $b$ of the wheel-house from side to side of the body when the doors are closed.

I have shown my invention as applied to a carriage having the front seat divided; but it is not material whether the carriage be so divided or not in so far as relates to my invention; but of course two seats are greatly preferable where they turn forward. The side sills D may be constructed as shown or in any desired manner, and the usual sill-plates will be applied to the inner face of the sill in the usual manner. The sections of the front seat are hinged at $d$, but may be arranged in any suitable manner.

In Figs. 3 and 4 the sills $a$ extend the length of the body, with the side sills D formed in two parts on each side and with the floor above the sills, which may in some cases be the most desirable method of construction.

I claim as my invention—

1. A carriage-body formed with an upward curve, termed a "wheel-house," and having the sides thereof set inward from the side sills, so as to be narrower than the full-width body when the doors are opened, but when they are closed constituting a full-width body, substantially as specified.

2. In a carriage-body, the side sills $a$ of the wheel-house set inward from sills D, as shown at $c$, and a projection $e$, formed upon the front seat to open and close the space between the inner face of the door and the end of the wheel-house, substantially as specified.

AUGUSTUS N. PARRY.

Witnesses:
GEORGE H. BRIGGS,
J. HOWARD STILES.